UNITED STATES PATENT OFFICE.

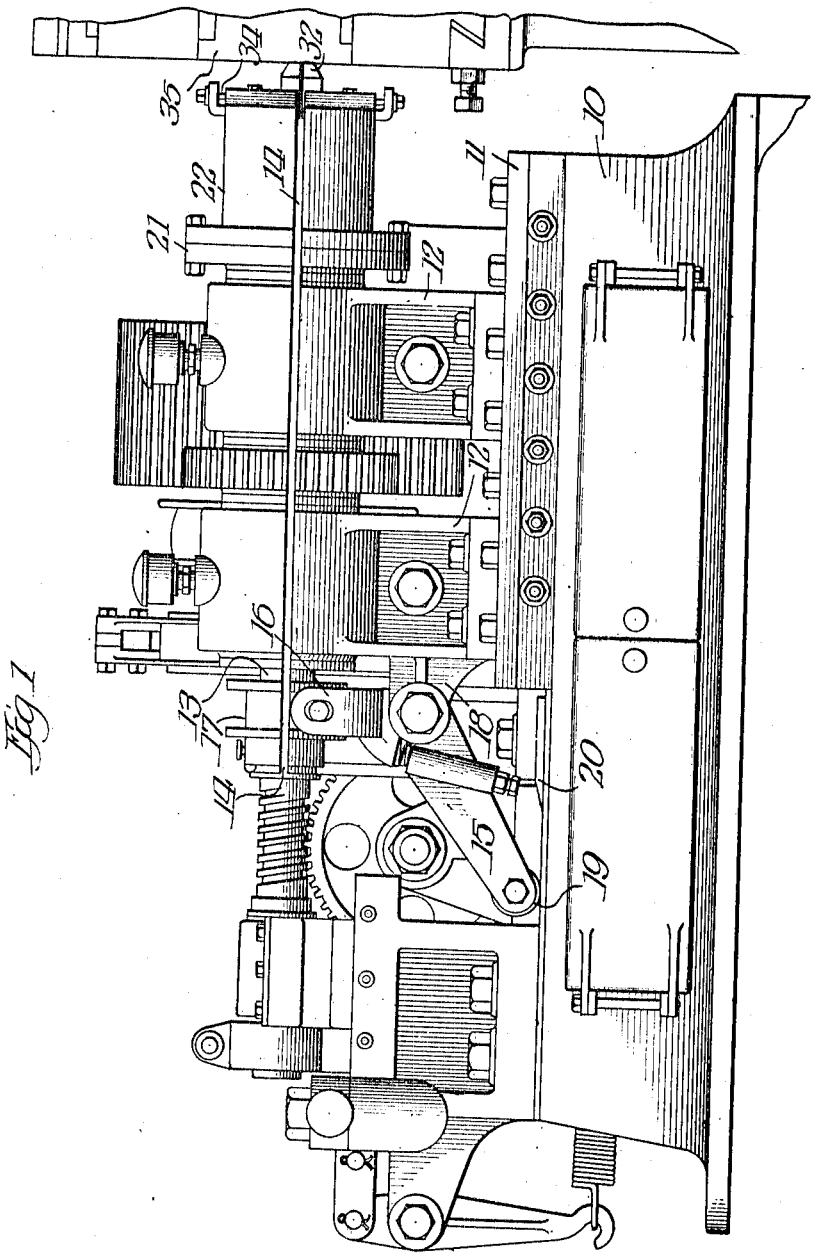

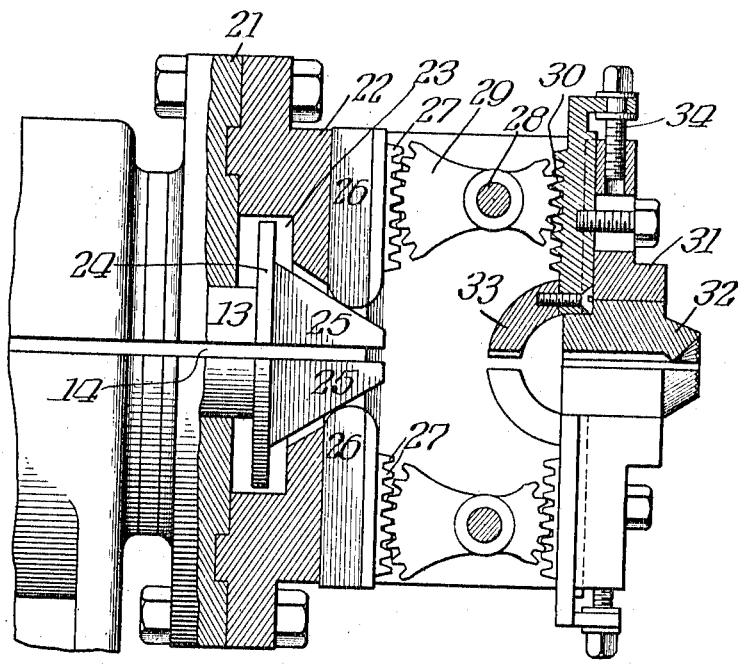

JOHN S. BANTA, OF WAUKEGAN, AND ALBERT T. WEAVER, OF JOLIET, ILLINOIS, ASSIGNORS TO THE AMERICAN STEEL & WIRE COMPANY OF NEW JERSEY, OF HOBOKEN, NEW JERSEY, A CORPORATION OF NEW JERSEY.

AUTOMATIC MACHINE FOR REMOVING BURS FROM ELECTRIC WELDS.

1,116,207.     Specification of Letters Patent.     Patented Nov. 3, 1914.

Original application filed August 23, 1912, Serial No. 716,606. Divided and this application filed January 24, 1914. Serial No. 814,082.

*To all whom it may concern:*

Be it known that we, JOHN S. BANTA and ALBERT T. WEAVER, citizens of the United States, and residing at Waukegan, in the county of Lake, State of Illinois, and Joliet, in the county of Will, State of Illinois, respectively, have invented certain new and useful Improvements in Automatic Machines for Removing Burs from Electric Welds, of which the following is a specification.

Our invention relates to automatic machines for removing burs from electric welds, and has particular reference to a novel construction originally disclosed in our co-pending application, Serial No. 716,606, filed August 23, 1912, this application being a division of matter originally contained in that application.

The practice of joining metallic articles by electric welding is well established. In such practice it is common to clamp the two parts to be welded, then pass an electric current through the contacting ends, causing the metal to be fused. At the same time one of the clamping jaws is advanced toward the other thus upsetting and causing an intimate union of the metal at the contacting ends of the article; in effect, the two ends are caused to flow or fuse and be joined as one. However, an amount of metal equal in extent to the movement of the parts toward each other is displaced and flows outside of the original contour of the article, thus forming what is usually called a bur; that is, a surplus of metal of irregular shape, which metal must be removed by turning or grinding if the article is to have a regular surface.

In the illustrations we have shown the device as applied to the wire working industry. In many cases two ends of wire are united and the resultant bur must be removed by some means before the article can be further treated or used. This entails a large amount of labor and has heretofore precluded the employment of an electric welding device in connection with wires to be passed through the galvanizing process or for nail or fabric machines.

The herein described machine is adapted for use in connection with an electric welding machine of any well known type. A welding machine is incompletely shown in some of the figures of the drawings and our automatic bur removing machine is so arranged that the operations of the two units, that is, the welding and the bur removing devices, are synchronous, the weld is formed and immediately thereafter the bur removing device advances and properly shapes the article. During this operation the otherwise free end of the wire is held in one of the welding machine clamps.

The objects of our invention may be stated to be as follows: first, to provide a machine which shall be almost entirely automatic in character, thus eliminating skilled labor in its operation; second, to provide a machine which shall be capable of wide adjustment to accommodate different gages of wire; also to accommodate itself to inequalities such as may be present in the gage of the wire.

Our present device relates to a modification in the form of the bur removing head and will be more readily understood by reference to the accompanying drawings, wherein—

Figure 1 is a side elevation of a machine constructed in accordance with our invention, and Fig. 2 is an enlarged sectional detail, showing the construction of the bur removing head.

Referring more particularly to the drawings, it will be seen that in our preferred machine we provide a base 10, having guides or ways 11 thereon within which is mounted, for horizontal movement, the bearing members 12, which members support a horizontal shaft 13, grooved as at 14, to permit the insertion of the wire to be treated, such wire being located, during operation, in the axial center of the shaft. This shaft is movable with the bearing members 12, and also independently movable by a bell crank 15 having a yoke 16 on one end thereof, which yoke coöperates with a grooved collar 17 on the shaft. The bell crank 15 is mounted on a bracket 18, carried by one of the bearing members 12, and is actuated by contact of an antifriction roll 19 on the end of the bell crank, with a cam 20 on the base 10. The bell crank and shaft are moved with the bearing members 12 to the right, as viewed in Fig. 1, and as the anti-friction roll rides up the cam 20, the shaft 13 is moved relative to its bearings, for a purpose about to be described.

Referring now to Fig. 2, it will be seen that secured to a face plate 21 is a head 22 within a recess 23, in which is located a disk 24 integral with the shaft 13. Projecting from the face of the disk 24, are wedge members 25, these members acting upon slides 26 mounted in guides in the member 22, and provided with a rack 27 on one face thereof. Pivoted in the head 22, on pins 28, are segmental gears 29, one portion of which gears coöperates with the rack 27, and another portion with racks 30 adjustably secured to the jaws 31, these jaws 31 carrying the milling tools 32. Also secured to the rack members 30 are gage members 33, by means of which the extent of movement of the jaws, and therefore the amount of metal removed, is controlled. The gage devices are adjusted by means of the set bolts 34. By the action just described, a parallel motion of the clamping jaws and milling devices is secured. It will be understood that a wire is carried in slot 14, and that as the parts move to the right, as viewed in Fig. 1, the milling tool will be brought into the plane of the weld which has been previously completed by the welding device shown partially at 35 in Fig. 1. As the parts advance, the bell crank rides up the cam 20, thus effecting an advance of the shaft 13, and therefore causing the wedging apart of the slides 26 and the forcing inward of the clamping jaws and milling tools 32. Inasmuch as the parts are rotating, the milling tool will remove the bur from the wire, whereupon, upon a reverse movement, the parts will be restored to the position of Fig. 1.

We claim:

1. A bur removing device, comprising a bifurcated head, each portion carrying a section of cutting tool, parallel motion means for advancing each section of said tool toward the work to be acted upon, means for rotating said head, and means for bodily advancing the head, substantially as described.

2. In a device of the class described, the combination of a rotatable shaft, a head carried on the end of said shaft, a bur removing tool carried by said head, parallel motion means for advancing and retracting said bur removing tool, and wedge means carried by the shaft adapted to actuate said parallel motion means, substantially as described.

3. In a device of the class described, the combination of a rotatable and bodily movable shaft, a head carried at one end of said shaft, a bur removing tool consisting of two segments, each segment thereof being carried by a jaw, a wedge carried by said shaft, and connecting racks and gears adapted to be actuated by said wedges for controlling the movement of said milling tool, substantially as described.

JOHN S. BANTA.
ALBERT T. WEAVER.

Witnesses to signature of John S. Banta:
C. R. PUTNAN,
O. F. BLACKMER.

Witnesses to signature of Albert T. Weaver:
JAMES E. SIME,
CHARLES H. SCHELTER.